United States Patent Office 2,777,876
Patented Jan. 15, 1957

2,777,876

SYNTHESIS OF α-CHLOROISOBUTYRIC ACID

Ernest A. Ikenberry, Donald G. Kundiger, and Donald D. Wheeler, Manhattan, Kans., assignors to The Dow Chemical Company, Midland, Mich., a corporation of Delaware No Drawing. Application September 23, 1953, Serial No. 381,993

5 Claims. (Cl. 260—531)

This invention is directed to an improved method for producing α-chloroisobutyric acid by reacting 1,1,1-trichloro-2-methyl-2-propanol with a hydrated aluminum chloride in the presence of a preferred solvent of reaction.

According to the present invention it has been found that 1,1,1-trichloro-2-methyl-2-propanol can be reacted with partially hydrated aluminum chloride at temperatures of from about 55° to about 110° C. in the presence of a nitro-aromatic hydrocarbon as reaction solvent to produce α-chloroisobutyric acid in good yields. The term "partially hydrated aluminum chloride" as herein employed refers to the product obtained by adding water to anhydrous aluminum chloride in the proportions of from about 0.5 to 1.5 moles of water per mole of aluminum chloride.

The partially hydrated aluminum chloride reactant may be prepared in any suitable fashion and, in general, is readily formed when anhydrous aluminum chloride and water are contacted in the proportions of one mole of the chloride to 0.5 to 1.5 moles of water. In one method of preparation anhydrous aluminum chloride and water in the above proportions are mixed together in an inert solvent. Alternatively, the partially hydrated reactant may be generated in situ in the reaction mixture by the concurrent addition of the proper proportions of water and anhydrous aluminum chloride. In such operation the water may be introduced into the reaction system wholly or in part in conjunction with the propanol reactant. Thus, for example, all or part of the necessary water may be introduced as water of hydration combined with the 1,1,1-trichloro-2-methyl-2-propanol employed. Although the reaction is operable with the above-mentioned range of proportions of water to aluminum chloride, it is preferred to employ a partially hydrated aluminum chloride composed of approximately equimolar proportions of water and anhydrous aluminum chloride.

In one method of carrying out the reaction, the 1,1,1-trichloro-2-methyl-2-propanol, partially hydrated aluminum chloride and nitro-aromatic hydrocarbon solvent are mixed together at a temperature below 50° C. and thereafter heated to a reaction temperature for a period of time to bring about and complete the reaction. In a further mode of operation, the partially hydrated aluminum chloride and a portion of the solvent are placed in a reaction vessel and heated to a reaction temperature and the 1,1,1-trichloro-2-methyl-2-propanol, dissolved in a further portion of solvent, added thereto with stirring, the temperature being maintained in the reaction range during the addition and for a period of time thereafter to complete the reaction. In yet another mode of operation, the 1,1,1-trichloro-2-methyl-2-propanol and solvent are mixed together in the reaction vessel, heated to the reaction temperature, and anhydrous aluminum chloride and water in the proportions as set forth above are added thereto concurrently with stirring. In any of the modes of operation, the reaction is initiated promptly when the reactants are contacted at a temperature within the reaction range and proceeds with the evolution of hydrogen chloride as by-product. On completion of the reaction, aluminum chloride complexes are decomposed with water and a strong mineral acid. The nitro-aromatic hydrocarbon solvent is then recovered and the desired α-chloroisobutyric acid product separated by conventional procedures such as extraction, washing and fractional distillation under reduced pressure.

The reaction solvent employed is a nitro-aromatic hydrocarbon, liquid at the reaction temperature. Members of this class of compounds operable in the present invention include mononitro-aromatic hydrocarbons such as nitrobenzene, ortho-nitrotoluene and the nitroxylenes. The reaction as carried out in nitrobenzene as a solvent constitutes a preferred embodiment of the invention. In the reaction, the nitro-aromatic hydrocarbon solvent appears to exert a desirable effect influencing the formation of a high yield of alpha-chloroisobutyric acid rather than tarry by-products.

Any suitable proportions of the reactants may be employed. However, for obtaining maximum yields it is usually desirable to employ at least one mole of partially hydrated aluminum chloride per mole of 1,1,1-trichloro-2-methyl-2-propanol.

The temperature of the reaction is critical for obtaining a desirable rate of reaction and good yields of chloroisobutyric acid with a minimum of undesirable by-products. At temperatures below 50° C. the reaction proceeds very slowly if at all. Satisfactory production of the desired product has been obtained when carrying out the reaction at temperatures of from about 55° to about 110° C. The reaction rate and yield of product increase with increasing temperature and it is preferred to employ reaction temperatures of from 70° to 100° C. Excessive temperatures are to be avoided as they result in increased production of tarry by-products and make more difficult the separation of the desired acid product in purified form.

The following examples illustrate the invention but are not to be construed as limiting the same:

Example 1

80.5 grams (0.603 mole) of anhydrous aluminum chloride was dispersed in 100 milliliters of nitrobenzene and 10.84 grams (0.603 mole) of water added thereto with stirring. The resulting mixture was heated to 100° C. and a solution of 107 grams (0.603 mole) of anhydrous 1,1,1-trichloro-2-methyl-2-propanol in 50 milliliters of nitrobenzene added portionwise with stirring over a period of 45 minutes. During the latter addition and for 15 minutes thereafter, the temperature of the reaction mixture was maintained at 100°–110° C. The crude reaction product was then poured into a mixture of ice and concentrated hydrochloric acid. The resulting mixture was saturated with sodium chloride and successively extracted with portions of diethyl ether. These ether extracts were combined and extracted with aqueous 20 percent potassium hydroxide solution to separate an alkaline, aqueous solution of the potassium salts of the acidic products of reaction from by-products and nitrobenzene. The latter was recoverable by fractional distillation. The aqueous alkaline extract was then cooled, acidified with excess hydrochloric acid and successively extracted with several portions of diethyl ether. The latter ether extracts were combined, dried and fractionally distilled to obtain as a residue a technical α-chloroisobutyric acid product in a yield of 65 percent of theoretical, based on the amount of 1,1,1-trichloro-2-methyl-2-propanol employed in the reaction.

Example 2

93.2 grams (0.5 mole) of the hemihydrate of 1,1,1-trichloro-2-methyl-2-propanol was dissolved in 150 milliliters of nitrobenzene and 4.5 grams (0.25 mole) of water added thereto with stirring. To the resulting mixture 66.7 grams (0.5 mole) of finely divided anhydrous aluminum chloride was added while stirring was continued and the temperature of the mixture maintained below 50° C. The mixture was then heated for 2 hours at a temperature of about 70° C. Thereafter the crude reaction product was poured into a mixture of ice and concentrated hydrochloric acid and the resulting mixture worked up as in Example 1 to obtain the desired α-chloroisobutyric acid product in a yield of 65 percent of theoretical.

*Example 3*

Following the procedure of Example 2, 1,492 grams (8 moles) of the hemihydrate of 1,1,1-trichloro-2-methyl-2-propanol, 72 grams (4 moles) of water and 1,068 grams (8 moles) of anhydrous aluminum chloride were mixed together in 2.4 liters of nitrobenzene and heated for a period of 4.5 hours at temperatures of 65° to 70° C. The resulting product was worked up as in the preceding examples to obtain a technical α-chloroisobutyric acid product in a yield of 56 percent of theoretical.

*Example 4*

93.2 grams (0.5 mole) of the hemihydrate of 1,1,1-trichloro-2-methyl-2-propanol and 150 milliliters of nitrobenzene were mixed together and heated to a temperature of about 100° C. To the resulting mixture 66.7 grams (0.5 mole) of anhydrous aluminum chloride and 9 grams (0.5 mole) of water were added portionwise and concurrently over a period of one hour. During this addition the reaction mixture was stirred vigorously and maintained at a temperature of about 100° C. The crude reaction product was poured into a mixture of ice and concentrated hydrochloric acid and worked up as in Example 1 to obtain the desired α-chloroisobutyric acid product in a yield of 51 percent of theoretical.

We claim:

1. The method for preparing α-chloroisobutyric acid which comprises reacting 1,1,1-trichloro-2-methyl-2-propanol with partially hydrated aluminum chloride in the presence of a nitro-aromatic hydrocarbon as reaction solvent at a temperature of from about 55° to about 110° C., said hydrated aluminum chloride consisting of the product resulting from the combination of anhydrous aluminum chloride with water in the proportions of one mole of the chloride to from about 0.5 to 1.5 moles of water.

2. A method according to claim 1 in which the partially hydrated aluminum chloride comprises in combination equimolar proportions of water and of anhydrous aluminum chloride.

3. A method according to claim 1 in which the reaction is carried out in a liquid mononitro-aromatic hydrocarbon as solvent.

4. A method according to claim 1 in which the reaction is carried out in nitrobenzene.

5. A method according to claim 1 in which the reaction is carried out at a temperature of from 70° to 100° C.

No references cited.